United States Patent [19]
Pruitt

[11] 3,709,366
[45] Jan. 9, 1973

[54] METHOD AND APPARATUS FOR SKIMMING A LIGHT LIQUID FROM THE SURFACE OF A BODY OF HEAVIER LIQUID

[75] Inventor: William H. Pruitt, Havertown, Pa.
[73] Assignee: Texaco Inc., New York, N.Y.
[22] Filed: Nov. 20, 1970
[21] Appl. No.: 91,420

[52] U.S. Cl. .............................210/242, 210/DIG. 21
[51] Int. Cl. .............................................E02b 15/04
[58] Field of Search.................210/84, 242, DIG. 21

[56] References Cited

UNITED STATES PATENTS

| | | |
|---|---|---|
| 2,876,903 | 3/1959 | Lee.................................210/242 X |
| 2,330,508 | 9/1943 | McColl................................210/242 |
| 3,534,858 | 10/1970 | Harrington..........................210/242 |
| 3,532,219 | 10/1970 | Valdespino..........................210/242 |
| 3,534,859 | 10/1970 | Ameao et al........................210/242 |

Primary Examiner—John Adee
Attorney—Thomas H. Whaley and Carl G. Reis

[57] ABSTRACT

A method or apparatus which acts to create plural vortices at the surface of a body of liquid floating on top. The vortices are created by locating plural conduits with the open ends a short distance beneath the surface, and then applying a suction that is greater than the hydraulic head between the open end of the conduit and the surface of the liquid. The light surface that is drawn off may be pumped into a storage tank for permitting separation.

1 Claim, 7 Drawing Figures

PATENTED JAN 9 1973          3,709,366

TO SUCTION PUMPS

METHOD AND APPARATUS FOR SKIMMING A LIGHT LIQUID FROM THE SURFACE OF A BODY OF HEAVIER LIQUID

BACKGROUND OF THE INVENTION

1. Field of the Invention

This invention relates to pollution control in general. More specifically, it concerns a method and apparatus for removing a light liquid, e.g. oil from the surface of a body of heavier liquid, e.g. water.

2. Description of the Prior Art

There have been many proposals for overcoming the pollution effects of spilled oil on bodies of water. Many such proposals have been concerned with ways of confining an oil spill in order to prevent spread over large areas. However, there has not been any known prior device for removing and recovering surface oil in large quantities effectively from a body of water. There have been various skimming arrangements proposed but these tend to have various drawbacks, such as that of being limited in the surface area that is effectively covered and also by the tendency to collect a large proportion of the water in addition to the floating oil thereon.

Thus, it is an object of this invention to provide improved surface liquid removal action that is particularly applicable to drawing off a lighter floating liquid from the surface of a heavier body of liquid.

SUMMARY OF THE INVENTION

Briefly, the invention concerns a method of skimming a lighter fluid floating on the surface of another. The method comprises the steps of creating a vortex on the surface of said other liquid and drawing off said lighter liquid as it is impelled into said vortex. It also comprises the step of storing said drawn off liquid to permit separation of the lighter liquid so that it may be recovered.

Again, briefly, the invention concerns apparatus for recovering a lighter liquid floating on the surface of another. It comprises in combination, a means for creating a vortex on the surface of said other liquid, and another means for drawing off said lighter liquid as it is impelled into said vortex. It also comprises means for storing said drawn off liquid to permit settling for separation of the lighter fluid.

Once more, briefly, the invention concerns apparatus for recovering lighter liquids floating on the surface of a body of water. It comprises in combination (1) a plurality of open ended pipes each having a coaxially located funnel shaped conduit therearound, and (2) a first manifold for connecting said pipes together. It also comprises (3) a second manifold for connecting said conduits together, and (4) float means including support structure for floatably supporting said pipes in a vertical position with the open ends thereof a predetermined distance below the surface of said body of water and said funnel shaped conduits with the wide mouthed open ends thereof spaced vertically from said pipe open ends. It also comprises (5) suction pumps for withdrawing said liquids through said pipes and funnel shaped conduits, and (6) flexible conduits for connecting said pumps to said first and second manifolds. And, it also comprises (7) a vessel having storage compartments for holding and settling said liquids from the water withdrawn therewith, and (8) means for discharging the withdrawn liquids from said pumps into said vessel.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENTS

Figure 1:
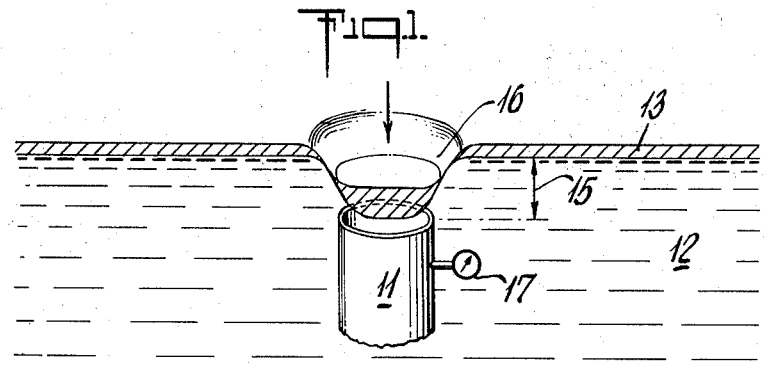
FIG. 1 is an enlarged schematic partially in perspective and illustrating some of the principles employed in the invention.

Referring to FIG. 1, there is schematically shown an open ended conduit 11 which is situated a short distance beneath the surface of a body of liquid. Body of liquid 12 has a surface layer of a lighter liquid 13 floating thereon. It will be appreciated that an important use for this invention will involve the situation where the body of liquid 12 is a body of water such as a lake or an ocean, while the surface layer of lighter liquid 13 is a layer of oil to be recovered. Such oil might be a spill from an oil tanker, or a drilling well, or the like.

Method

A method contemplated in accordance with this invention is that which carries out the following steps. (1) The step of creating a vortex 16 at the surface of the body of water 12, so that the surface floating liquid 13 will be impelled or drawn into the vortex thus created. While various arrangements might be employed, the vortex may be created by application of a suction to the conduit 11. Such suction should be greater than a "-head" 15 which is illustrated in FIG. 1, and which is the distance to the surface of the water from the open end of the conduit 11. The amount of suction being applied may be measured, if desired, and there is schematically indicated a pressure gauge 17 that would of course be located elsewhere, but which is shown attached to the conduit 11. The direction of swirling rotation in the vortex will tend to be in one direction or the other depending upon which hemisphere of the earth contains the body of water.

(2) Another step is that of drawing off the floating liquid as it is impelled into the vortex. It will be appreciated that having created the vortex at the surface of the body of liquid, it will be a simple matter to draw off the liquids that are sucked into the conduit 11. This will include not only the surface oil 13 that is directly above the open end of the conduit 11, but by reason of the vortex, it will tend to draw in the floating surface layer of oil from a surrounding area. Of course, the liquids drawn off will include some of the body of water 12 along with the surface oil. Both may be pumped into a storage vessel or tank where separation can take place.

(3) As already indicated, a final step of the method is to store the liquid that is drawn off. This will permit a natural separation to take place. If the action is at sea, storage could be in a barge preferably with a number of compartments.

It will be appreciated that the method might involve a plurality of vortices. These would be spaced laterally apart so as to cover a wide area of the surface of the body of water.

Apparatus

Figure 2:
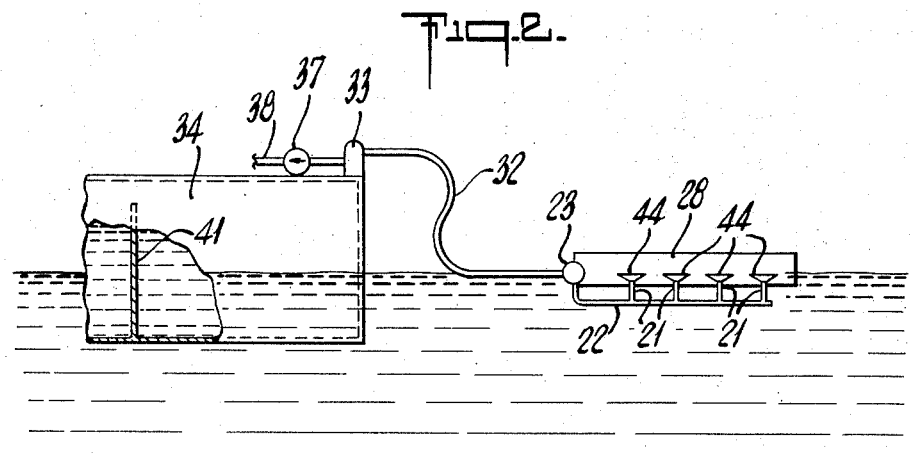
FIG. 2 is a side elevational schematic illustrating one form of apparatus according to the invention.
Figure 3:
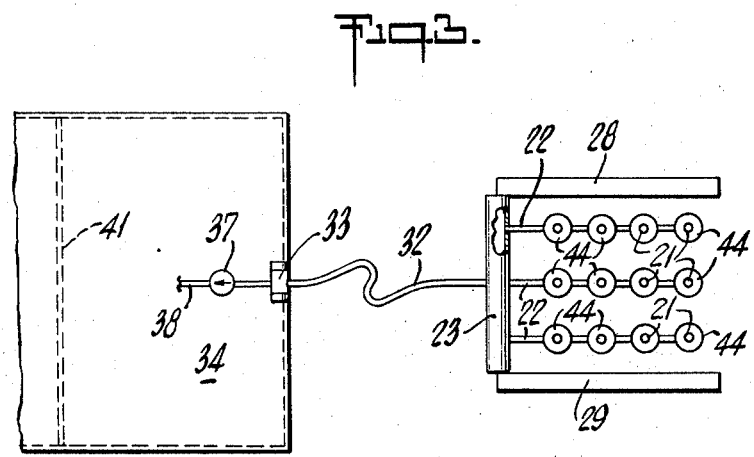
FIG. 3 is a plan view of the apparatus illustrated in FIG. 2.

Referring to FIGS. 2 and 3, it will be observed that one preferred form of apparatus for this invention may include a plurality of conduits 21. These are connected together in groups by common pipes that connect into a manifold 23. The whole group of conduits 21 are supported in any feasible manner from a pair of floats 28 and 29, so that the open ends of the conduits 21 will rest a short distance beneath the surface of the body of water.

The manifold 23 is connected by any feasible piping arrangement, e.g. a flexible pipe 32 which connects to a swivel 33 that is carried on a barge 34. On the other side of the swivel 33, there is piping (as required) to connect a suction that is applied to the conduits 21. The outlet from pump 37 will go via any feasible piping 38 to deposit the oil and water that is drawn off, into one or more compartments in the barge 34. It will be observed that there is illustrated a compartment wall 41 which separates one compartment and allowed to settle for separation while further incoming liquids are pumped into another compartment.

It will be noted that, as indicated in FIG. 2 and in FIG. 3, a plurality of vortices 44 are created above the conduits 21. In this manner, a wide area of the surface of the body of water may be cleared of the floating oil in a rapid and efficient manner.

Figure 4:
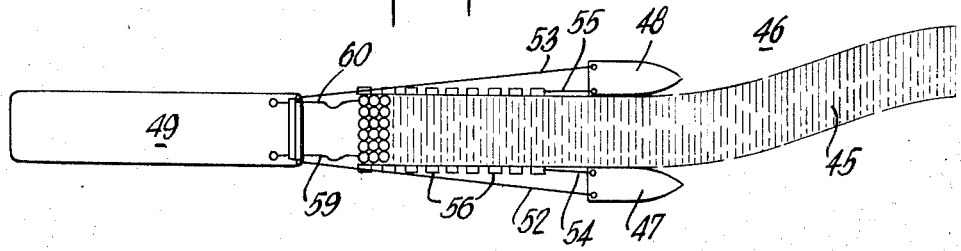
FIG. 4 is a schematic plan view of two tug boats pulling a barge and a group of skimmer units according to a different modification of the invention.
Figure 5:
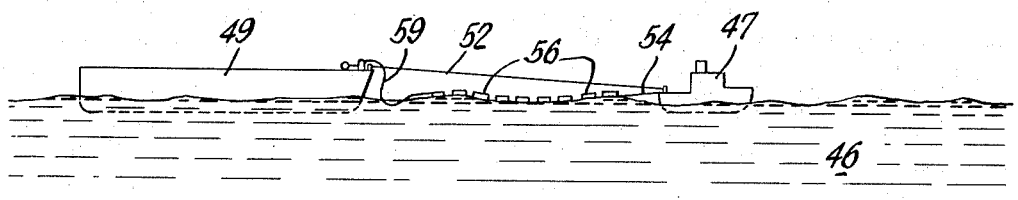
FIG. 5 is a side elevation of the tugs and barge shown in FIG. 4.

Referring now to FIGS. 4–7, it will be observed that FIGS. 4 and 5 illustrate one manner of carrying out the invention in connection with the recovery of an oil slick 45 on the surface of a large body of water 46. It involves the use of two tug boats 47 and 48 that have connected in tow a barge 49 which has a number of compartments (not shown) for holding the skimmed oil and water mixture in a similar manner as was described above in connection with the FIGS. 2 and 3 illustrations.

There are, of course, tow cables 52 and 53 for attaching the tug boats 47 and 48 respectively, to the barge 49. In addition, there are appropriate lines 54 and 55, as shown, to pull a plurality of skimmer units 56 along behind the tub boats for removing the oil slick. The oil and surface water mixture is drawn off through a pair of flexible conduits 59 and 60 to the barge 49, after being gathered by appropriate manifold structures, as will be indicated in greater detail below.

It will be appreciated that the size and number of the skimming units may be varied in the individual case, as appropriate. The units are individually buoyant with flexible interconnection so that they will follow surface wave action and maintain a desired depth of skim in spite of large waves.

The barge 49 has the necessary flexible coupling, or couplings, as well as manifolding and suction pumps. These are provided in a like manner as the equipment that is described above in connection with FIGS. 2 and 3. It provides for applying the desired amount of suction, and directs the oil and mixed water into the barge 49 where the oil may separate out for recovery.

Figure 6:
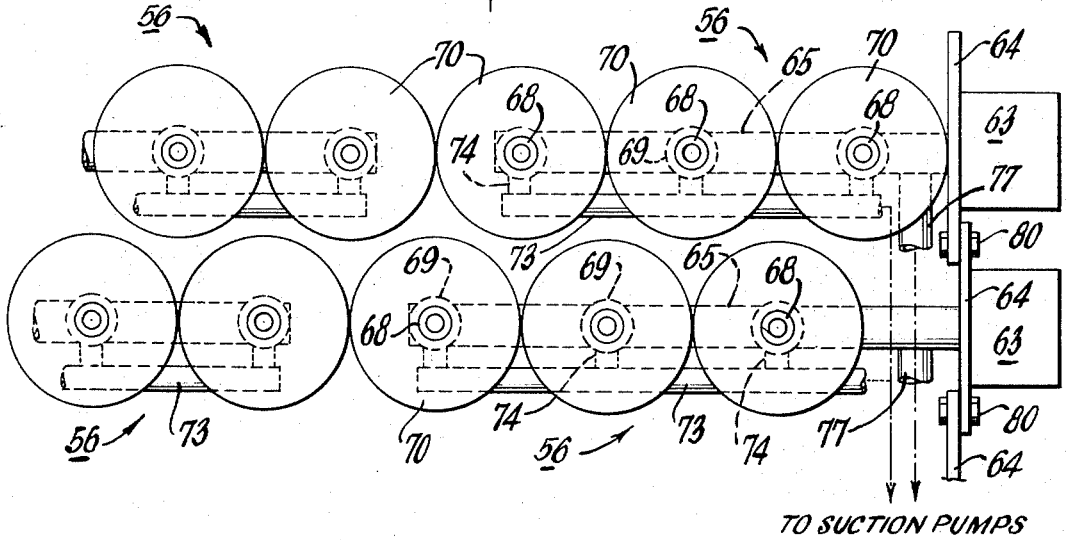
FIG. 6 is an enlarged plan view of some of the skimmer units according to the different modification illustrated in FIGS. 4 – 7.
Figure 7:
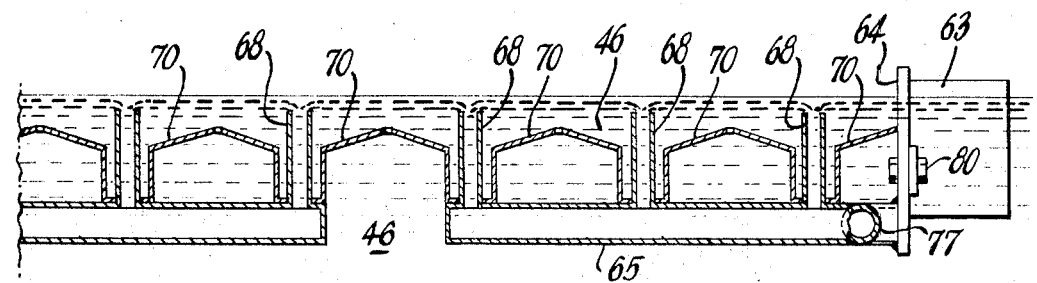
FIG. 7 is a side elevation partly in cross section of some of the units illustrated in FIG. 6.

Now referring to FIG. 6 and FIG. 7, it will be observed that there are shown in FIG. 6 two of the units 56 plus parts of two more, all attached compactly together to cover a substantial amount of surface area. FIG. 7 shows one of these units and part of another, both in side elevation with substantial portions broken away in longitudinal cross section.

Each unit 56 has a float 63 that is attached to one side of a vertically disposed plate 64. Attached to the other side of the plate 64, there is a manifold 65 for joining together a series of open ended vertically disposed pipes 68. These pipes 68 extend up from the manifold 65 so as to be situated with their open ends a short distance beneath the surface of the body of water 46.

Surrounding each of the pipes 68 there is a coaxially situated conduit 69 and each conduit 69 has a funnel shaped wide mouth 70. These wide mouths of conduits 69 extend up beneath the surface of the body of water 46, but not as close to the surface as the open ends of the pipes 68.

There is another manifold 73 on each unit 56 that has all of the conduits 69 connected thereto by short radially situated conduits 74. In this manner all of the manifolds 73 may be joined together by flexible couplings and hoses (not shown) for applying the desired amount of suction to the wide mouth conduits.

At the same time there will be provision for applying suction to the pipes 68 via the manifolds 65. Each manifold 65 has a conduit 77 extending at right angles and located near the mounting plate 64. These conduits 77 may be connected to a common suction line (not shown) as is indicated by the caption in FIG. 6. i.e. "To Suction Pumps".

Each of the units 56 is attached to one or more adjacent unit in a pivotal manner by having bolts 80 which go through overlapping edges of the plates 64. In this manner a group of the units 56 may be attached to cover a substantial area where it is desired to recover a floating oil slick or the like.

It may be noted that the arrangement is such as to permit the application of suction to either the pipes 68 or the wide mouth conduits 69 separately if desired. Of course, the suction may be applied to both at once and in different amounts, as desired. The use of different combinations of these possible ways of applying suction may depend upon the type of oil slick or the like that is to be recovered. It is contemplated that the amount of suction should be greater than the head of liquid above the pipes or conduits, in order to create the vortices.

It will, of course, be appreciated that this invention may be employed in conjunction with surface barrier arrangements (not shown) if desired, in order to provide some funneling action for the surface oil to direct it toward the surface skimming equipment that includes the plural conduits 21 or 68 and 69. It will also be noted that apparatus according to this invention lends itself readily in a very practical manner to use with a barge that can contain large quantities of liquid and therefore will have an adequate capacity for rapidly cleaning the surface where an oil spill may have occurred. It would be expected that after the settling time for separation of oil in a given compartment, the bottom water could be pumped out to make room for more oil.

While particular embodiments of the invention have been described in considerable detail in accordance with the applicable statutes, this is not to be taken as in any way limiting the invention, but merely as being descriptive thereof.

I claim:

1. Apparatus for recovering a lighter liquid floating on the surface of another, comprising in combination
   - a1. a plurality of open ended conduits facing upwards,
   - a2. means for supporting said conduits with said open ends a predetermined vertical distance beneath the surface of said liquids and spaced laterally apart for forming a corresponding plurality of vortices,
   - a3. means for connecting the other ends of said conduits (a1) to a common pipe,
   - a4. means for applying suction to said conduits (a1) greater than the hydraulic head of vertical distance (a2),
   - a5. a wide mouth second conduit concentrically surrounding each open ended conduit (a1),
   - a6. means for supporting said second conduits with said wide mouths below said open ends,
   - a7. means for applying suction to said second conduits for drawing off additional surface liquids from beneath said lighter liquids, and
   - b. means for drawing off said lighter liquid as it is impelled into said vortices.

* * * * *